Patented Dec. 13, 1949

2,490,851

UNITED STATES PATENT OFFICE 2,490,851

PRODUCTION OF LITHIUM AMIDE AND OTHER METAL COMPOUNDS

Peter P. Alexander, Beverly, Mass., assignor to Metal Hydrides Incorporated, Beverly, Mass., a corporation of Massachusetts No Drawing. Application March 6, 1947, Serial No. 732,922

17 Claims. (Cl. 23—190)

This invention relates to the production of compounds of hydride forming metals and more particularly, although not exclusively, to the production of compounds of lithium, such as lithium hydride, lithium amide, etc.

The problem of producing pure lithium amide has been studied for some time and various chemical procedures have been proposed, such as dissolving and reacting lithium with aqueous ammonia. So far as I am aware such methods have not been commercially satisfactory. The present invention contemplates, among other things described hereinafter, the production of lithium amide by a pyrometallurgical method.

The present invention is based upon several discoveries observed when a mixture of finely divided lithium oxide and magnesium flakes was heated at an elevated temperature in a closed receptacle in the presence of anhydrous ammonia. First, an atmosphere of hydrogen was established within the receptacle by dissociation of ammonia and the free nitrogen was consumed to form solid magnesium nitride. The lithium oxide was reduced by reaction with the excess magnesium in the presence of the free hydrogen and lithium hydride and magnesium oxide formed. Substantially no lithium nitride was formed although the reaction conditions were favorable for its production. Furthermore, no substantial amount of lithium amide was formed until substantially all the magnesium had been consumed and converted to magnesium nitride and magnesium oxide. Perhaps the most surprising and unpredictable discovery was that the reduction of the lithium oxide proceeded to substantial completion before all the magnesium had been consumed. When the consumption of the magnesium was substantially complete, the anhydrous ammonia reacted with the reduced lithium or lithium hydride to form lithium amide.

In accordance with one method of practicing the invention, a mixture of finely divided lithium oxide and magnesium flakes is heated gradually in a closed retort in the presence of a predetermined limited amount of anhydrous ammonia to about 500° C. by the application of externally applied heat to start the reaction. Any suitable apparatus may be employed but I prefer to employ an apparatus of the general type described in my Patent No. 2,408,748. The first reaction to start is dissociation of ammonia to establish an atmosphere containing hydrogen. The reaction is slightly endothermic and requires a small amount of additional heat. The reaction starts at about 500° C. but proceeds to completion more rapidly at a higher temperature. From a practical viewpoint, I prefer to employ a temperature between about 500° and 900° C. A higher temperature may be used but a temperature greater than about 1000° C. is not recommended and I prefer to use a temperature of about 700° C. The charge is maintained at substantially the same elevated temperature until the reduction of the lithium oxide is completed. As this reaction proceeds to completion, the gas pressure within the retort drops and unless an excess of hydrogen is present, it is desirable to admit an inert gas, such as argon or helium, to maintain a positive pressure within the retort above atmospheric pressure to prevent seepage of air into the retort. The inert gas also serves to dilute the ammonia and hydrogen gases and assists in controlling the rate and temperature of the reactions. When the gas pressure within the retort ceases to drop, the reduction of the lithium oxide is complete. The temperature of the charge then is reduced to between 300° C and 500° C. and, preferably, to about 400° C. An additional amount of anhydrous ammonia then is admitted into the retort and reacts with the lithium hydride to form lithium amide. The lithium amide may be separated from the charge by heating the charge above the boiling point (430° C.) of lithium amide and the distilled lithium amide may be condensed in a cooler part of the retort. The condensed material exhibited all the characteristics of pure lithium amide.

If the desired final product is lithium hydride, the retort may be cooled substantially to room temperature after the reduction of the lithium oxide has been effected and the hydride may then be separated from the reaction mass in known manner. If desired, the charge may be heated to dissociate the lithium hydride and distill the lithium and condense it in a cooler part of the retort. The condensed lithium then may be hydrided.

The amount of magnesium used should be sufficient to combine with all the oxygen of the lithium oxide and consume all the nitrogen. The amount of ammonia used should be such as to provide a sufficient amount of hydrogen to assist in the reduction of the lithium oxide and convert it to lithium hydride. If the amount of magnesium used is increased, a corresponding increased amount of ammonia may be used for the reduction of the lithium oxide and formation of lithium hydride and thus assure an excess of hydrogen sufficient to maintain the gas pressure within the retort above atmospheric pressure.

Other metal hydrides may be produced by the method of the invention by replacing the lithium oxide with the oxides of other hydride forming metals, such as the oxides of zirconium, titanium, tantalum, the alkaline earth metals, other alkali metals, etc. Other metal amides may be produced by the method of the invention by replacing the lithium oxide with the oxides of other metals, such as the oxides of the other alkali metals, calcium oxide or other alkaline earth metals. In the practice of the invention, the magnesium may be replaced by any of the various metals commonly used for reducing refractory oxides and which are capable of forming nitrides. For example, the magnesium may be replaced by aluminum, silicon, ferro-silicon, the alkaline earth metals, etc. It is preferable to employ a reducing metal, the nitride of which has a greater heat of formation than the nitride of the hydride forming metal.

In producing metal amides by the method of the invention, instead of introducing a predetermined limited amount of anhydrous ammonia into the retort to effect reduction of the oxide of the hydride forming metal, anhydrous ammonia may be supplied continuously while heating the charge as previously described. In such case, the reactions proceed in the same manner. In some instances, it is desirable to increase slightly the proportion of the nitride forming reducing metal used to assure substantially complete reduction of the oxide of the hydride forming metal before all the reducing metal has been consumed. When the reducing metal has been consumed, the amide forming reaction proceeds to completion.

The method of the invention, as compared with previous methods for producing lithium amide, has the advantage of production in one operation without removing the charge from the furnace or retort, eliminating the additional labor and the possibilities of contamination of the produced material during successive handling. The method also possesses inherent versatility in that it is applicable for the production of metal amides, metal hydrides, or metals from the oxides of hydride forming metals utilizing anhydrous ammonia which is a cheap and readily available gas. The method of this invention is applicable for the reduction of metal oxides the heat of formation of which is less than that of the oxide of the reducing metal.

I claim:

1. In a method for producing compounds of metals, the steps which comprise heating an oxide of an amide forming metal with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, hydriding the reduced metal by heating in the presence of said hydrogen, and thereafter heating the reaction mass in the presence of anhydrous ammonia to form the amide of the amide forming metal.

2. In a method for producing compounds of metals, the steps which comprise heating an oxide of an amide forming metal with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, and hydriding the reduced metal by heating in the presence of said hydrogen.

3. In a method for producing compounds of metals, the steps which comprise heating an oxide of an alkaline earth metal with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, and hydriding the reduced metal by heating in the presence of said hydrogen.

4. In a method for producing compounds of metals, the steps which comprise heating an oxide of an alkali metal with a reducing metal capable of forming a nitride in the presence of anhydrous ammonia in a closed receptacle thereby establishing an atmosphere within the receptacle comprising hydrogen, reducing said oxide by heating in the presence of said reducing metal and said hydrogen, and hydriding the reduced metal by heating in the presence of said hydrogen.

5. In a method for producing compounds of metals, the steps which comprise heating an oxide of an alkali metal with magnesium in the presence of anhydrous ammonia in a closed receptacle thereby establishing an atmosphere within the receptacle comprising hydrogen, reducing said oxide by heating in the presence of said magnesium and said hydrogen, and hydriding the reduced metal by heating in the presence of said hydrogen.

6. In a method for producing lithium compounds, the steps which comprise heating lithium oxide with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, and hydriding the reduced lithium by heating in the presence of said hydrogen.

7. In a method for producing lithium compounds, the steps which comprise heating lithium oxide with magnesium in the presence of anhydrous ammonia in a closed receptacle thereby establishing an atmosphere within the receptacle comprising hydrogen, reducing said oxide by heating in the presence of said magnesium and said hydrogen, and hydriding the reduced lithium by heating in the presence of said hydrogen.

8. In a method for producing compounds of metals, the steps which comprise heating an oxide of an alkali metal with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, and thereafter heating the reaction mass in the presence of anhydrous ammonia to form the amide of the alkali metal.

9. In a method for producing compounds of metals, the steps which comprise heating an oxide of an alkali metal with magnesium in the presence of anhydrous ammonia in a closed receptacle thereby establishing an atmosphere within the receptacle comprising hydrogen, reducing said oxide by heating in the presence of said magnesium and said hydrogen, and thereafter heating the reaction mass in the presence of anhydrous ammonia to form the amide of the alkali metal.

10. In a method for producing lithium compounds, the steps which comprise heating lithium oxide with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, and thereafter heating the reaction mass in the presence of anhydrous ammonia to form lithium amide.

11. In a method for producing lithium compounds, the steps which comprise heating lithium oxide with magnesium in the presence of anhydrous ammonia in a closed receptacle thereby establishing an atmosphere within the receptacle comprising hydrogen, reducing said oxide by heating in the presence of said magnesium and said hydrogen, and thereafter heating the reaction mass in the presence of anhydrous ammonia to form lithium amide.

12. In a method for producing lithium compounds, the steps which comprise heating lithium oxide with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, thereafter heating the reaction mass in the presence of anhydrous ammonia to form lithium amide, and separating lithium amide from the reaction mass by distillation.

13. In a method for producing lithium compounds, the steps which comprise heating lithium oxide with magnesium in the presence of anhydrous ammonia in a closed receptacle thereby establishing an atmosphere within the receptacle of comprising hydrogen, reducing said oxide by heating in the presence of said magnesium and said hydrogen, thereafter heating the reaction mass in the presence of anhydrous ammonia to form lithium amide, and separating the lithium amide from the reaction mass by distillation.

14. In a method for producing compounds of metals, the steps which comprise heating an oxide of an alkaline earth metal with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, and thereafter heating the reaction mass in the presence of anhydrous ammonia to form the amide of the alkaline earth metal.

15. In a method for producing compounds of metals, the steps which comprise heating an oxide of an alkaline earth metal with magnesium in the presence of anhydrous ammonia in a closed receptacle thereby establishing an atmosphere within the receptacle comprising hydrogen, reducing said oxide by heating in the presence of said magnesium and said hydrogen, and thereafter heating the reaction mass in the presence of anhydrous ammonia to form the amide of the alkaline earth metal.

16. In a method for producing compounds of metals, the steps which comprise heating calcium oxide with a reducing metal capable of forming a nitride and in the presence of anhydrous ammonia in a closed receptacle thereby establishing an atmosphere within the receptacle comprising hydrogen, reducing said oxide by heating in the presence of said reducing metal and said hydrogen, and thereafter heating the reaction mass in the presence of anhydrous ammonia to form calcium amide.

17. In a method for producing compounds of metals, the steps which comprise heating calcium oxide with magnesium in the presence of anhydrous ammonia in a closed receptacle thereby establishing an atmosphere within the receptacle comprising hydrogen, reducing said oxide by heating in the presence of said magnesium and said hydrogen, and thereafter heating the reaction mass in the presence of anhydrous ammonia to form calcium amide.

PETER P. ALEXANDER.

REFERENCES CITED

The following references are of record in the file of this patent:

UNITED STATES PATENTS

| Number | Name | Date |
| --- | --- | --- |
| 2,401,326 | Archibald et al. | June 4, 1946 |

OTHER REFERENCES

Mellor, "Comprehensive Treatise on Inorganic and Theoretical Chemistry," vol. 8, pp. 253–4.